United States Patent [19]

Harigae

[11] Patent Number: 4,944,587
[45] Date of Patent: Jul. 31, 1990

[54] STAR SENSOR

[75] Inventor: Masatoshi Harigae, Yokohama, Japan

[73] Assignee: Kabushiki Kaisha Toshiba, Kawasaki, Japan

[21] Appl. No.: 318,635

[22] Filed: Mar. 3, 1989

[30] Foreign Application Priority Data

Mar. 17, 1988 [JP] Japan .................................. 63-64059
Jan. 17, 1989 [JP] Japan ..................................... 1-5947

[51] Int. Cl.$^5$ ............................................... B64G 1/36
[52] U.S. Cl. .................................. 356/152; 250/203.6; 250/206.2; 356/141; 364/455
[58] Field of Search ..................... 250/203 R; 356/141, 356/152, 247, 248; 364/455

[56] References Cited

U.S. PATENT DOCUMENTS 3,263,088 7/1966 Goldfischer .
3,992,106 11/1976 Auerbach .
4,084,087 4/1978 Mehwald .
4,306,691 12/1981 Boxenhorn et al. .
4,617,634 10/1986 Izumida et al. ...................... 364/455
4,621,329 11/1986 Jacob .
4,746,976 5/1988 Kamel et al. ........................ 364/455

OTHER PUBLICATIONS

IAF-84-375, "Autonomous GPS-INS-STAR Integrated Navigation System Concept for Maneuvering Spacecraft", T. Tanabe, M. Harigae and H. Koyama, Univ. of Tokyo, Oct. 7-13, 1984.

Primary Examiner—Charles T. Jordan
Assistant Examiner—Richard W. Wendtland
Attorney, Agent, or Firm—Cushman, Darby & Cushman

[57] ABSTRACT

A star sensor compares predetermined star information stored in a memory and actual star information corresponding to star image signals from an imaging device. A processing device generates an attitude signal corresponding to the attitude of a base with respect to the star when the predetermined and the actual star information substantially coincide. A correcting device corrects the predetermined star information when the predetermined star information and the actual star information are not substantially the same.

6 Claims, 5 Drawing Sheets

FIG. 4

(INFORMATION OF A STAR POSITION AND A MAGNITUDE OF BRIGHTNESS)

| ADDRESS | NUMBER | RIGHT ASCENSION (DEGREE) | DECLINATION (DEGREE) | MAGNITUDE OF BRIGHTNESS |
|---|---|---|---|---|
| 1000 H | 1 | 145.588 | 37.234 | 2 |
| 1016 H | 2 | 146.103 | 36.989 | 5 |
| 102C H | 3 | 145.921 | 35.111 | 1 |
| ⋮ | ⋮ | ⋮ | ⋮ | ⋮ |

FIG. 5

(INFORMATION OF ANGULAR SEPARATION)

| ADDRESS | RANGE OF ANGULAR SEPARATION | COMBINATION OF STARS |
|---|---|---|
| 2014 H | 0 ~ 0.01° | 0001 0005, 0008 0009,-- |
| 2023 H | 0.01° ~ 0.02° | 0016 0020, 0139 0150,... |
| 203C H | 0.02° ~ 0.03° | 0035 0048, 0098 0121,-- |
| ⋮ | ⋮ | ⋮ |

STAR SENSOR

BACKGROUND OF THE INVENTION

1. Field of the Invention

This invention relates to a star image sensor. More specifically, the invention relates to a sensor attached to an artificial satellite for detecting the attitude information of the satellite corresponding to a star image signal.

2. Description of the Related Art

Generally, a star sensor is used for detecting attitude information of an artificial satellite with a high accuracy to control the attitude of the satellite.

A star sensor in the related art includes an imaging device for detecting a star image and producing a star image signal to be supplied to a matching device. The matching device detects star information, such as the angular separation of stars, and compares the star information corresponding to the star image signal with memorized star information in a memory. The matching device generates an output signal corresponding to the attitude information of the satellite when the star information and the memorized star information match.

In this star sensor, the memorized star information in the memory is information corresponding to the brightness and the position of stars which were observed by a celestial telescope on the ground. Therefore, the information stored in the memory includes an error corresponding to vibrations and variations caused by the atmosphere. Also, there is a possibility that there may be no information about a dark star. In the related art, when the star information from the imaging device and the memory do not match due to the error or a lack of star information in the memory, it is difficult to detect the attitude information of the satellite with a high accuracy.

To observe a defined portion of a celestial body or a defined star in a specified direction in space, a spacecraft has to control and maintain its attitude with a high accuracy and direct an observing device in the specified direction. In such a spacecraft, information from the imaging device and the memory do not match, an improvement for detecting accurate attitude information is required.

SUMMARY OF THE INVENTION

It is an object of the present invention to detect attitude information of a spacecraft with a high accuracy when actual star information from an imaging device and predetermined star information from a memory do not substantially match.

It is a further object of the present invention to correct a predetermined star information stored in the memory when the actual star information from an imaging device and predetermined star information from the memory do not substantially match.

It is still a further object of the present invention to detect accurate attitude information of a spacecraft by using another complementary attitude detector.

To achieve the above objects and in accordance with the purpose of the invention, as embodied and broadly described herein, the invention comprises imaging means fixed to a base, such as a satellite, for generating star image signals corresponding to the appearance of a star; memory means for storing predetermined star information corresponding to the magnitude of brightness and position of the star; processing means connected to the imaging means for determining actual star information from the star image signals corresponding to the magnitude of brightness and position of the star, and generating an attitude signal corresponding substantially to the orientation of the base with respect to the star when the predetermined star information and the actual star information substantially coincide: detecting means for generating an output signal corresponding substantially to the attitude of the base with respect to a predetermined orientation; and correcting means responsive to the detecting means for correcting the predetermined star information stored in the memory means when the predetermined star information and the actual star information do not substantially match.

BRIEF DESCRIPTION OF THE DRAWINGS

The present invention is best understood with reference to accompanying drawings in which:

FIG. 4 and FIG. 5 each shows star information stored in the memory means;

DESCRIPTION OF THE PREFERRED EMBODIMENTS

Figure 1:
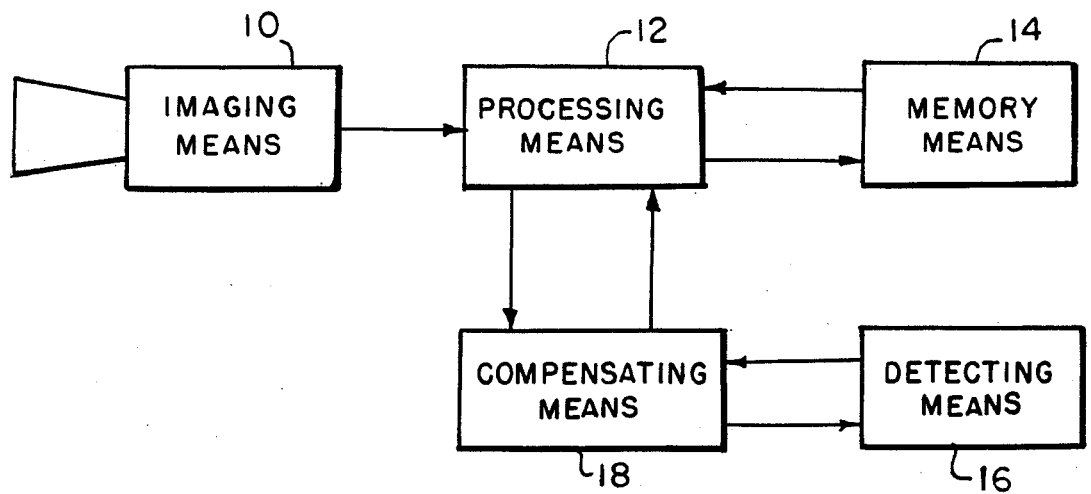
FIG. 1 is a block diagram of a star sensor according to one embodiment of this invention.

Referring to the accompanying drawings, an embodiment of the present invention will be described. However, in the drawings, the same numerals are applied to the similar elements in the drawings, and therefore the detailed description thereof is not repeated.

As shown in FIG. 1, the imaging device 10 is a device, such as CCD (Charge Coupled Device) camera, to detect a star image and produce a star image signal corresponding to the appearance of a star. A star sensor is installed in a base, such as an artificial satellite, and the imaging means 10 is fixed to the satellite. If the direction of the satellite varies, the direction of the optical axis of the imaging means 10 also varies in accordance with the attitude variation of the satellite. Processing means 12 comprises a central processing unit (CPU) and detects actual star information corresponding to the star image signal from the imaging means 10. The actual star information includes the magnitude of brightness of the star and the angular separation of the stars. Memory means 14 comprises a random access memory (RAM) and stores predetermined star information observed by a celestial telescope on the ground. The processing means 12 compares the actual star information corresponding to the image signal with the memorized predetermined star information in the memory means 14. The processing means 12 includes output means for generating an attitude signal corresponding substantially to the orientation of the satellite with respect to the star when the actual and predetermined star information substantially match. Detecting means 16 comprises an inertial navigation system (INS) and generates an output signal corresponding substantially to the attitude of the satellite with respect to a predetermined orientation.

The detecting means 16 may comprise a sun sensor or an earth sensor (not shown). The output signal from the detecting means 16 may include an error greater than the error included in the attitude signal from the output means. Compensating means 18 compensates for the error included in the output signal from the detecting means 16 by using the attitude signal from the output means when the actual star information corresponding to the star image signal and the memorized predetermined star information in the memory 14 substantially coincide. According to this compensation, the attitude information from the detecting means 16 can maintain the same accuracy as the star sensor. When the matching of the star information is not completed in the processing means 12, the processing means 12 detects the direction of the imaging means 10 corresponding to the attitude information from the detecting means 16. The predetermined star information stored in the memory 14 which corresponds to the direction of the imaging means 10 is corrected by using the actual star information corresponding to the star image signal.

Figure 2:
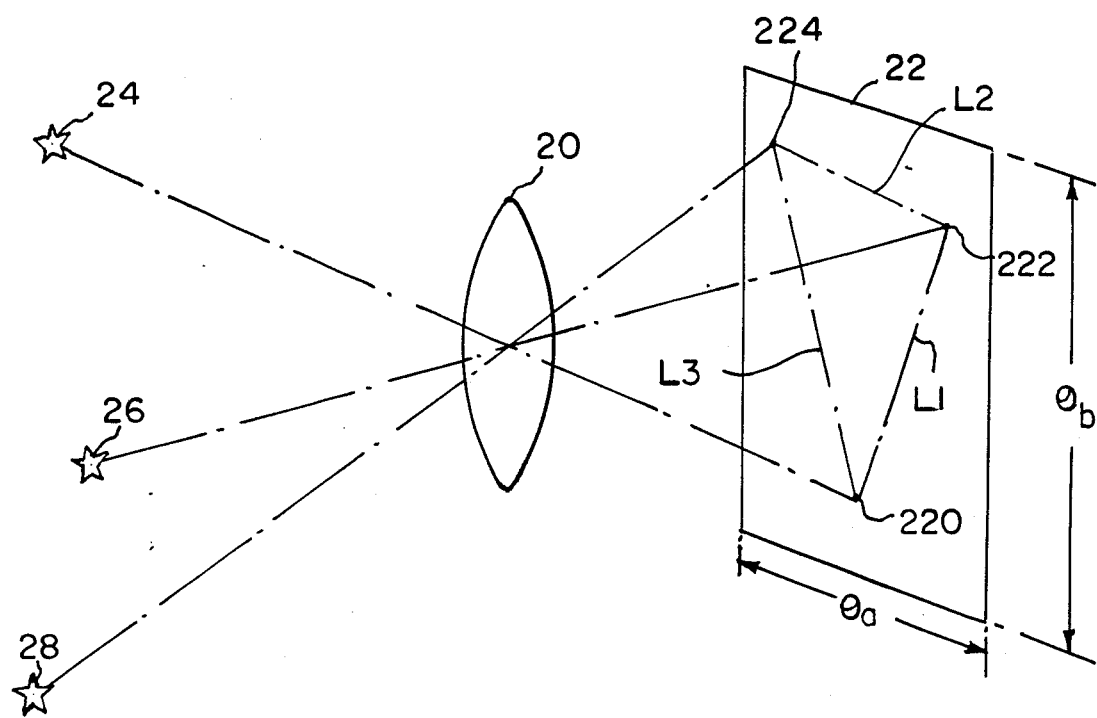
FIG. 2 illustrates a star image in the imaging means shown in FIG. 1.

FIG. 2 illustrates a star image in the imaging means 10 shown in FIG. 1. In the optical lens 20 of the imaging means 10, the fields of view a, b corresponding to an angular range of an image are each 8 degrees, so that each image 220, 222, 224 of at least 3 stars 24, 26, 28 can be formed on an image detecting element 22. If the image detecting element 22 is a CCD element, the amount of charges generated by the star images 220, 222, 224 correspond to the magnitude of brightness of the stars 24, 26, 28, and the position of the star images 220, 222, 224 on the image detecting element 22 can be detected according to the order of the transfer of the charges.

Figure 3:
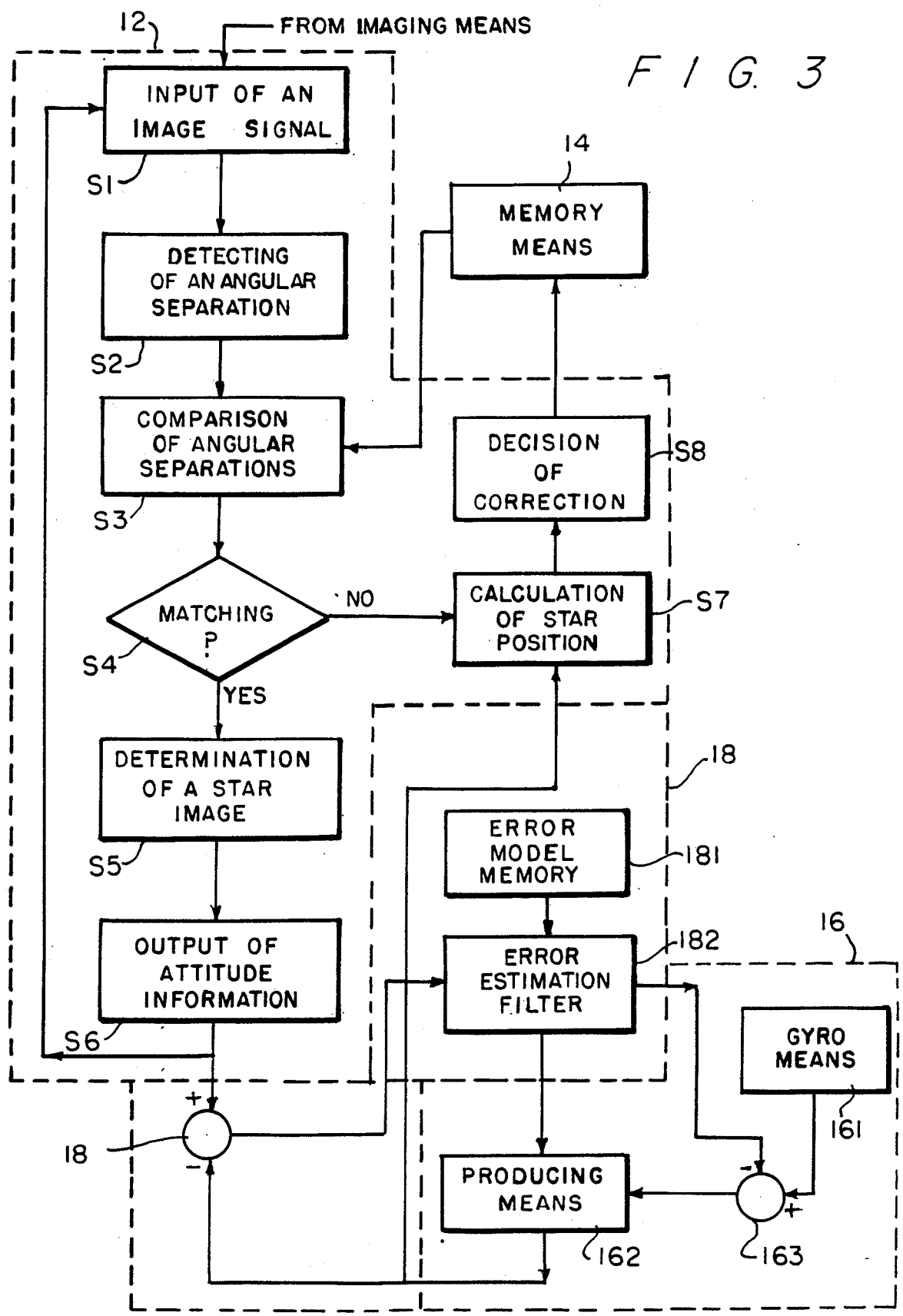
FIG. 3 is a partially detailed block diagram of the star sensor shown in FIG. 1.

FIG. 3 is a partially detailed block diagram of the star sensor shown in FIG. 1. The processing means 12 executes an image signal processing according to steps Si-S8. The processing means 12 leads the star image signal from the imaging means 10 at step S1. At step S2, the angular separations L1, L2, L3 (shown in FIG. 2) of the stars are detected on the image detecting element 22. These angular separations L1, L2, L3 correspond to the distance between the stars on the image detecting element 22. At step S3, these detected angular separations L1, L2, L3 are compared with the predetermined angular separations corresponding to the memorized information in the memory means 14 The memory means 14 stores the predetermined star information including a preassigned number for the star, the magnitude of brightness, the right ascension, the declination and the angular separation, as shown in FIG. 4, FIG. 5. This information is based on actual observations by a celestial telescope on the ground and is not necessarily the same as the actual star information which is observed in space because of variations caused by the atmosphere. The preassigned number of the star is a serial number, one of which corresponds to each of about 5,000 stars. The right ascension and the declination of the star are based on the position of the star from the equatorial coordinates at zero hours on the Vernal Equinox Day in 1950. The memory means 14 stores information about the magnitude of brightness from first magnitude to sixth magnitude. As to the angular separation, the memory means 14 stores the combination of the stars which exist within a predetermined angular separation range, such as 0.01 degrees, as shown in FIG. 5. At step S3 in FIG. 3, the combinations of the stars, which are included in a defined angular separation range including the angular separation detected at step S2, are detected. Then, the angular separation corresponding to each detected combination of the stars is determined from the right ascension and the declination of each star memorized in the memory means 14. This calculated angular separation corresponding to the memorized information is compared with the actual angular separation detected at step S2. When the calculated and actual angular separations are substantially the same, the combination of the stars corresponding to the actual angular separation can be verified. The location of a star corresponding to the star image in the imaging means 10 can be defined at step S5. Accordingly, the accurate attitude information of the satellite is detected from the right ascension and the declination of the defined star at step S6. The specified angular separation at step S5 is very accurate to 0.001 degree. Therefore the detected attitude information of the satellite can be available for the attitude control of the satellite very precisely. When the calculated and the actual angular separation do not match substantially at step S4 because of the error included in the memorized information, the flow goes on step S7. At steps S7 and S8, the correction of the memorized information is executed. In this case, the star information stored in the memory means 14 corresponding to the direction of the imaging means 16 must be corrected. The detecting means 16 is applied to detect the direction of the imaging means 10. However, this detecting means 16 is, for example, an inertial navigation system (INS), and the accuracy of an INS is inferior to that of a star sensor. Though a sun sensor or an earth sensor also can be useful as the detecting means 16, their accuracy is about the same as the INS. Accordingly, the correcting of the predetermined star information by using the output signal of the detecting means 16 does not fully compensate for the error in the information, and does not provide sufficient accuracy. According to an embodiment of the invention, the error included in the output signal of the detecting means 16 can be removed when the matching at step S4 is completed to detect the attitude information of the satellite with a high accuracy. When the detecting means 16 is an INS, the detecting means 16 includes gyro means 161 attached to the satellite for generating a gyro signal corresponding to the rotational angle of the satellite about a prescribed reference axis and producing means 162 for producing a gyro attitude signal in response to the gyro signal from the gyro means 161. The gyro means 161, includes a mechanical gyro having 3 rotors 3-axes orthogonal to each other or an optical gyro, and detects the angular velocity of the satellite about each axis. The producing means 162 integrates the angular velocity corresponding to an output signal from the gyro means 161 to calculate the attitude angle of the satellite.

The compensating means 18 includes an error model 81 and an error estimation filter 182. The error model memory 181 stores a plurality of predetermined correction factors, each corresponding to a specified relation between two errors included in two output signals of the gyro means 161 and the producing means 162. The relation between the two errors is represented by a differential equation as follows, $$\frac{d}{dt}\begin{pmatrix} \delta e_x \\ \delta e_y \\ \delta e_z \\ \delta b_x \\ \delta b_y \\ \delta b_z \end{pmatrix} = \begin{pmatrix} 0 & W_z & -W_y & -1 & 0 & 0 \\ -W_z & 0 & W_x & 0 & -1 & 0 \\ W_y & -W_z & 0 & 0 & 0 & -1 \\ 0 & 0 & 0 & 0 & 0 & 0 \\ 0 & 0 & 0 & 0 & 0 & 0 \\ 0 & 0 & 0 & 0 & 0 & 0 \end{pmatrix} \begin{pmatrix} \delta e_x \\ \delta e_y \\ \delta e_z \\ \delta b_x \\ \delta b_y \\ \delta b_z \end{pmatrix}.$$

$t$: Time, $W_x, W_y, W_z$: The angular velocity corresponding to the output signal from the gyro means 161, $\delta e_x, \delta e_y, \delta e_z$: The error included in the output signal from the producing means 162, $\delta b_x, \delta b_y, \delta b_z$: The error included in the output signal from the gyro means 161.

The error estimation filter 182 is called Kalman Filter. The filter 182 is designed to identify the primary error or source of the detecting means 16 by using output information from the subtracter 183 and a probability distribution of the error included in the output signal from the detecting means 16.

The output information from the subtracter 183 corresponds to the difference between attitude information from the processing means 12 and the detecting means 16. The probability distribution is obtained from the stored information in the memory 181 The filter 182 supplies a first output signal to a subtracter 163 for removing the output error of the gyro means 161, and supplies a second output signal to the producing means 162 for removing the output error of the producing means 162. The two output determined in the filter 182.

According to this embodiment, the detecting means 16 can detect the attitude information of the satellite with almost the same accuracy as the star sensor by the evaluation and the correction of the error source. The detecting accuracy of the detecting means 16 has been always improving and keeping to the same degree as the star sensor by the operation of the compensating means 18 while the star sensor can detect the attitude information of the satellite. In such a condition, when the matching is not completed at step S4 and the star sensor cannot detect the highly accurate attitude information of the satellite, the star information to be corrected in the memory 14 can be selected by using the highly accurate attitude information from the detecting means 16. The position of the star corresponding to the star image signal from the imaging means 10 is obtained at step S7 when the matching is not performed at step S4.

Figure 6:
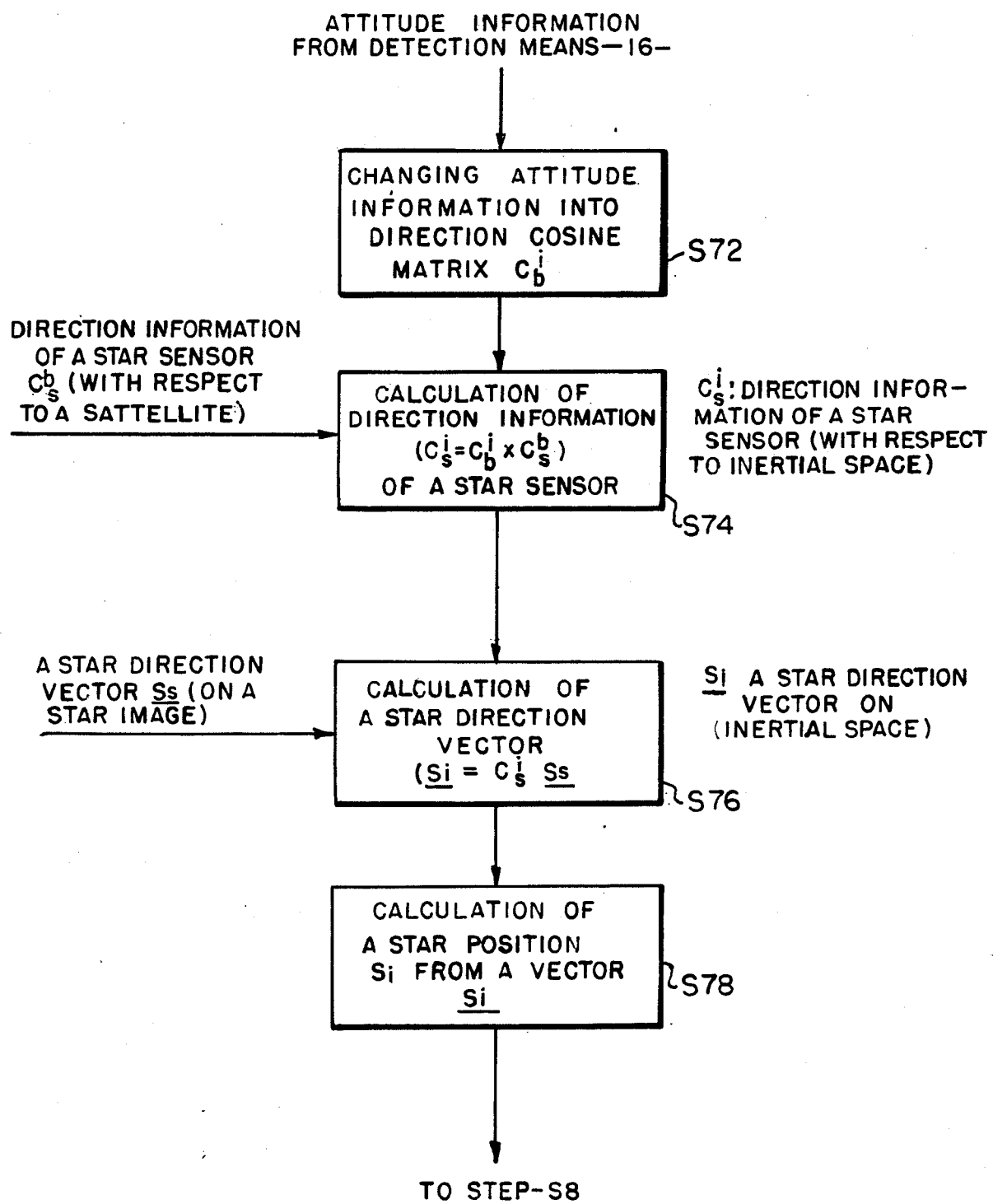
FIG. 6 is a flow chart illustrating the operation of step S7, shown in FIG. 3.
Figure 7:
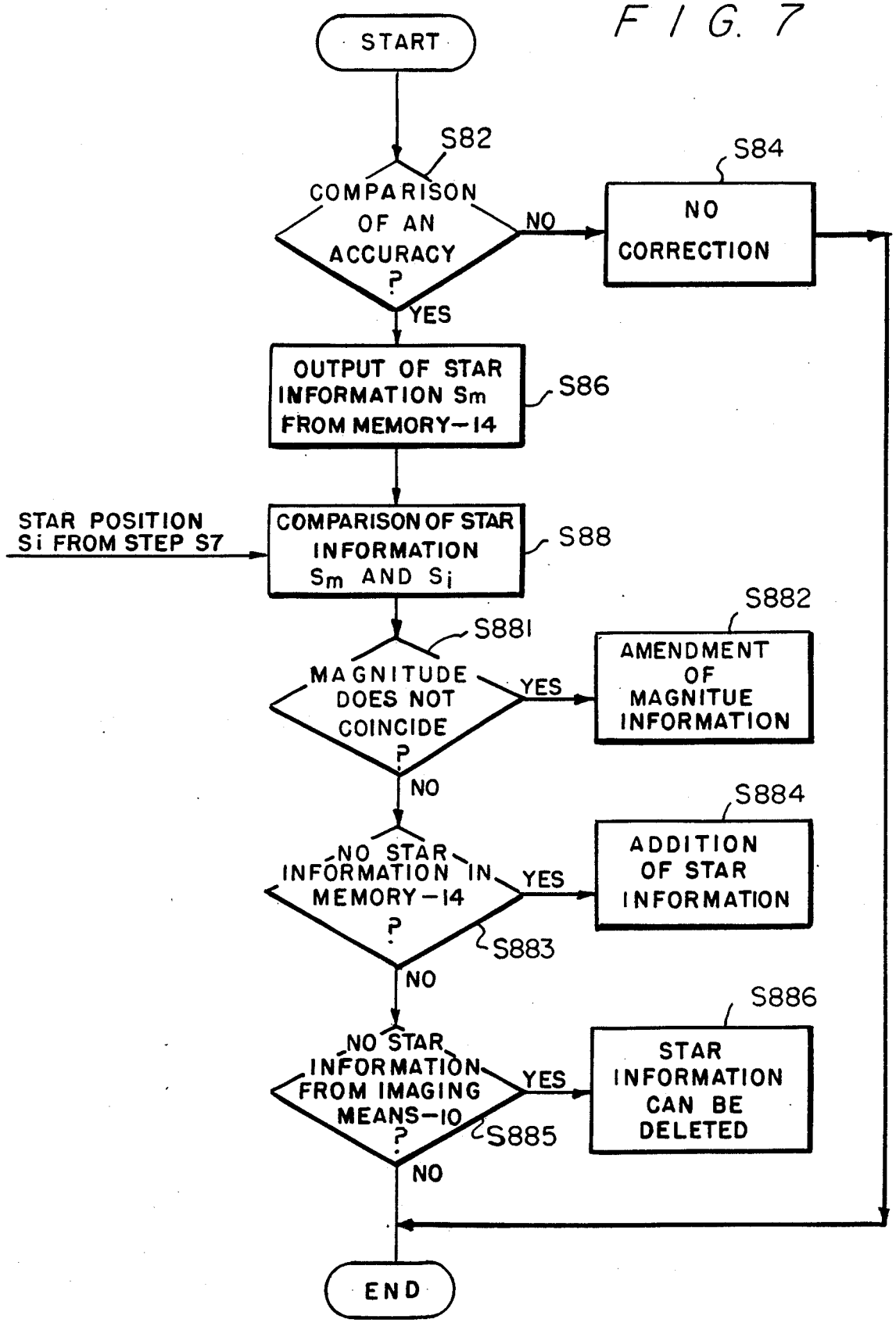
FIG. 7 is a flow chart illustrating the operation of step SB, shown in FIG. 3.

FIG. 6 is a flow chart illustrating the operation at step S7 shown in FIG. 3. The attitude information of the satellite from the detecting means 16 is converted to a Direction Cosine Matrix $C^i{}_b$, which is a 3x3 matrix representing the rotational angle of the satellite about each axis, at step S72. A direction information $C^i{}_s$ of the star sensor with respect to inertial space, that is, a direction information of the imaging means 10, is obtained by multiplication with a direction information $C^b{}_s$ and the attitude information $C^i{}_b$ at step S74. The direction information $C^b{}_s$ represents the orientation of the star sensor with respect to the satellite and is a 3x3 matrix calculated in the processing means 12. At the next step S76, a star direction vector Si in inertial space is calculated by multiplication with a direction information $C^i{}_s$ and a star direction vector Ss on the star image. The star direction vector Ss is a star direction vector with respect to the optical axis of the optical lens 20 of the imaging means 10, and is obtained in the processing means 12. At step S78, each star position in inertial space, that is, the right ascension and declination of each star are calculated from the vector Si. The correction of the star information in the memory 14 is executed according to a decision at step S8 by using each star position Si. FIG. 7 is a flow chart illustrating the operation of step S8 shown in FIG. 3. At step S82, the accuracy of the attitude information from the detecting means 16 is compared with the accuracy of the star sensor. When the accuracy of the detecting means 16 is not the same level as that of the star sensor, the correction of the star information is not performed at step S84 and the flow is over. When the accuracy of the detecting means 16 is the same level as that of the star sensor, the star information $S_M$ corresponding to the direction of the star sensor is output from the memory 14 at step S86. This information $S_M$, which includes the right ascension and declination of the star and the magnitude of brightness of the star, is the star information to be corrected. At step S88, the star information $S_M$ is compared with the star information Si calculated at step S78. When the right ascension and declination of both $S_M$ and Si substantially coincide and only magnitude of brightness of the stars do not coincide at step S881, the magnitude information of the star in the memory 14 is changed into the magnitude of the star information Si corresponding to the output information from the imaging means 10 at step S882. When the magnitude information of the star does not match and the memory 14 has no star information having the same position information as the star information Si at step S883, the star information Si is added to the memory 14 at step S884. If there is no star information on the star image detected by the imaging means 10 corresponding to the star information $S_M$ in the memory 14 at step S885, the star information $S_M$ is specified as the information which can be deleted at step S886 because the information $S_M$ in the memory 14 does not exist in fact. The deletion of the information $S_M$ is executed in response to a command signal from the ground station.

In case the star information from the imaging means 10 and the memory 14 do not match at step S4 in FIG. 3, as mentioned above, the star information in the memory 14 is corrected by using the star information detected by the imaging means 10 in space. Accordingly after that correction, the star sensor can detect the attitude information of the satellite highly accurately because the star information match in the direction of the star sensor in which the star information do not match before the correction.

The memory means 14 may include a read only memory for storing the predetermined star information observed from the ground and a random access memory for storing the corrected star information.

Numerous modifications and variations of the present invention are possible in light of the above the teachings. It is therefore to be understood that, within the scope of the appended claims, the present invention can be practiced in a manner other than as specifically described herein.

What is claimed is:

1. A star sensor for attachment to a base, comprising:

imaging means fixed to the base for generating star image signals corresponding to the appearance of a star from the base;

memory means for storing predetermined star information corresponding to an assumed magnitude of brightness and position of the star;

processing means connected to the imaging means for determining actual star information from the star image signals corresponding to the actual magnitude of brightness and position of the star, and generating an attitude signal corresponding substantially to the orientation of the base with respect to the star when the predetermined star information and the actual star information substantially coincide;

detecting means for generating an output signal corresponding substantially to the attitude of the base with respect to a predetermined orientation; and correcting means responsive to the detecting means for correcting the predetermined star information stored in the memory means when the predetermined star information and the actual star information do not substantially coincide.

2. The sensor of claim 1, wherein the processing means includes means for computing the attitude of the base with respect to the star when the predetermined star information and the actual star information substantially coincide;

the detecting means includes means for determining the attitude of the base with respect to the predetermined orientation; and the sensor also includes means for compensating for any difference between the computed attitude of the base with respect to the star and the determined attitude of the base with respect to the predetermined orientation.

3. The sensor of claim 2, wherein the detecting means includes gyro means for generating a gyro signal corresponding to the rotational angle of the base about a prescribed reference axis; and producing means for producing a gyro attitude signal in response to the gyro signal.

4. The sensor of claim 3, wherein the compensating means includes an error memory for storing a plurality of predetermined correction factors, each corresponding to a specified relation between the gyro signal and the gyro attitude signal;

a subtracter for comparing the gyro attitude signal from the producing means and the attitude signal from the processing means; and determining means connected to the error memory for determining the difference between the attitude signal and the gyro attitude signal.

5. The sensor of claim 1, wherein the memory means includes means for storing data corresponding to combinations of the stars within a predetermined angular separation range.

6. The sensor of claim 5, wherein the processing means includes means for detecting the angular separation of the stars from the star image signal;

selecting means for selecting from the memory means combinations of the stars within a specified angular separation range including the angular separation; and means for identifying only the combination of the stars corresponding to the star image signals from the selected combinations of the stars.

* * * * *